United States Patent
Rundt et al.

[11] Patent Number: 5,324,943
[45] Date of Patent: Jun. 28, 1994

[54] METHOD FOR SCINTILLATION COUNTING AND A SCINTILLATION COUNTER WITH ADJUSTABLE COINCIDENCE RESOLVING TIME

[75] Inventors: Kenneth Rundt; Timo Oikari, both of Turku, Finland

[73] Assignee: Wallac OY, Turku, Finland

[21] Appl. No.: 859,458

[22] PCT Filed: Dec. 1, 1989

[86] PCT No.: PCT/FI89/00222
§ 371 Date: May 29, 1992
§ 102(e) Date: May 29, 1992

[87] PCT Pub. No.: WO91/08496
PCT Pub. Date: Jun. 13, 1991

[51] Int. Cl.$^5$ .................................. G01T 1/204
[52] U.S. Cl. ........................ 250/328; 250/362; 250/364; 250/369
[58] Field of Search ............... 250/362, 364, 328, 369

[56] References Cited
U.S. PATENT DOCUMENTS

| | | | |
|---|---|---|---|
| 4,652,751 | 3/1987 | Rundt et al. | 250/328 |
| 5,120,962 | 6/1992 | Rundt et al. | 250/328 |

Primary Examiner—Carolyn E. Fields
Attorney, Agent, or Firm—Adduci, Mastriani, Schaumberg & Schill

[57] ABSTRACT

A method for scintillation counting and a scintillation counter exploiting a coincidence technique, in which the coincidence resolving time is flexible and can be automatically adjusted to fit the scintillation characteristics of each sample separately. This is accomplished by measuring during a short initial period the pulse length of the scintillation pulses, and adjusting the coincidence resolving time of the coincidence analyzer before the actual counting of the sample.

16 Claims, 7 Drawing Sheets

METHOD FOR SCINTILLATION COUNTING AND A SCINTILLATION COUNTER WITH ADJUSTABLE COINCIDENCE RESOLVING TIME

FIELD OF THE INVENTION

This invention relates to a method and an apparatus for determining the amounts of a radioactive isotope in scintillation samples. More particularly this invention relates to a determination of quench level and quench correction in a scintillation counter.

BACKGROUND OF THE INVENTION

Scintillation counting of soft beta-emitters like tritium and carbon-14 is a very common analytical technique in life sciences. The aim of this technique is to accurately determine the activity of one or several radioactive isotopes dissolved in a special scintillation liquid held in a transparent vial. The scintillation counter can normally count several hundreds of vials (samples) in an automatic manner without attendance.

The standard scintillation counter comprises a detector compartment for sequentially holding each sample at a time. Normally the detector comprises two photomultiplier (pm) tubes simultaneously converting photon pulses that are emitted from the sample into electrical pulses. The pm tubes normally work according to the coincidence technique. In this technique, the electrical pulses from both tubes are fed into an electronic circuit, called the coincidence analyzer, which passes pulses on to pulse height analyzers and scalers only if there is a pulse in both of the two photomultiplier tubas within a certain time period, called the coincidence resolving time. The function of the coincidence analyzer can shortly be described as follows: assume that a scintillation pulse causes an analog output pulse at the output of one of the two pm tubes. At a certain time, the analog output pulse exceeds a certain threshold and sets a logic signal that will prevail for a finite time period, equal to the coincidence resolving time. Normally, the coincidence resolving time is quite short, typically in the order of about 15 ns. If during the coincidence resolving time an analog output pulse from the other pm tube triggers the coincidence analyzer, the analyzer sets its output gate signal to indicate a coincidence pulse. This output gate signal causes the analog pulse height analyzer to accept the two analog pulses from the two pm tubes. Normally the two analog pulses are summed before further analysis by pulse height analyzers and scalers or a multichannel analyzer.

A radioactive disintegration is a fast phenomenon in itself, but the process, in which the disintegration energy is transformed into photons, may extend over a considerable time period, e.g. up to a few microseconds. The characteristics of this scintillation pulse, the intensity and its decay rate, depends on the scintillation medium. In most media, the decay consists of two parts: the prompt part, which is the major part, and the slow, or delayed part. The prompt part, which originates from the lower excited singlet states immediately formed at the disintegration, is so short and instant that most of the photons can be observed during the first 20 ns after the disintegration. A typical scintillation pulse is shown in FIG. 1. The slow part, which is dependent on the formation of higher excited and ionized states, may extend over a considerable time period and photons in this part may not be noticed by the coincidence analyzer. This fact is of no concern when the total number of photons is high, as in that case there be many photons in the prompt part and a high probability that both pm tubes will receive photons within the coincidence resolving time. But if only a few photons are emitted, the first photon has a high probability to occur within the prompt part, and the next may occur much later, or within the slow part, after the coincidence resolving time. In this case the coincidence analyzer will not accept this pulse. Thus, if the coincidence resolving time is short in comparison to the decay rate of the slow part, there is a certain chance that a disintegration resulting in only two or three detected photons will not cause a coincidence condition. This situation arises typically with low energy isotopes like tritium in certain scintillation media. In scintillation counting this may cause two undesirable effects: 1) the counting efficiency is unnecessarily reduced and 2) the pulse height spectrum is distorted as a result of a proportion of pulses with low pulse heights being missed. A similar problem has been reported by Wonderly and Quint (S. W. Wonderly and J. F. Quint, PCT WO 89/02089) when measuring solid scintillators of a certain type. Wonderly and Quint suggested that the coincidence resolving time should be longer than usual when measuring solid scintillators of the type described in the patent.

In scintillation counting, quenching of the scintillation light is a very important factor to consider. Quenching in the samples means that the number of emitted photons is decreased. The counting efficiency, defined as the ratio between the detected pulse rate to the disintegration rate, is dependent of the degree of quenching. Usually the degree of quenching and the counting efficiency has to be determined for each sample separately. As the position of the scintillation spectrum on the pulse height scale also is dependent on the degree of quenching, one can use this measure as a quench index proportional to the quench level. By the use of an empirical calibration curve (quench curve), the counting efficiency is computed from the determined quench index. The mean pulse height (MPH) is an often used measure for the position of the scintillation spectrum as this is relatively easy to compute. If the coincidence resolving time is short, then the shape of the spectrum, and also the mean pulse height will depend on the intensity and the decay rate of the delayed part. The higher the intensity and the slower the decay rate of the delayed part, the more pulses will be lost in the low amplitude region of the spectrum—causing the counting efficiency to decrease and MPH to increase. FIG. 2 portrays the general influence of the coincidence resolving time on the shape of a tritium spectrum. As a result of this effect, a quench curve based on standards prepared with a solvent having an insignificant delayed part can not be used for quench correction of samples prepared with a solvent having a significant delayed part. As an example, FIG. 3 shows four quench curves prepared with standards based on toluene, xylene, pseudocumene and di-isopropyl-naphthalene. These quench curves were measured in a normal scintillation counter with the coincidence resolving time equal to 15 ns.

Not only the solvent is important in this respect. Also the quenching agent has an effect on the decay rate of the delayed part. This effect is demonstrated in FIG. 4, which shows the quench curves for standards based on toluene, but with two different quenchers: carbon tetrachloride and acetone.

The two FIGS. 3 and 4 demonstrate a general problem in scintillation counting: the composition of the quench curve standards has to be exactly the same as for the samples. This is not always possible to accomplish. In most cases, only one quench curve is generated and used with all sorts of samples, causing systematical errors of more or less unknown magnitude in the computed radioactivity. It is possible to decrease the systematical error by increasing the coincidence resolving time. FIG. 5 shows quench curves for the same samples as used in FIG. 3, but now the coincidence resolving time was increased to above 250 ns. FIG. 6 shows quench curves for the same samples as used in FIG. 4, but now the coincidence resolving time was increased to above 70 ns.

When measuring liquid samples containing low energy isotopes like tritium it is generally necessary that the coincidence resolving time is kept as short as possible in order to reduce the risk for random coincidences between single photon events from thermal noise of pm tubes or chemiluminescence in the sample. Therefore, it is not an acceptable solution to have the coincidence resolving time always excessively long, e.g. 300 ns. A much better solution is to have the instrument automatically adjusting the coincidence resolving time according to the pulse lengths of each sample separately. This can be accomplished by measuring a value for a parameter that is proportional to the shape or length of the scintillation pulse and applying an empirical rule to adjust the coincidence resolving time.

DESCRIPTION OF THE INVENTION

The objective of this invention is a scintillation counter in which the coincidence resolving time of the coincidence analyzer can be adjusted automatically for each sample separately in such a way that quench correction can be performed by using one quench curve only. This can be accomplished by dividing the measurement of the sample into two periods: during the first period the measured pulse length (mpl) of the scintillation pulses produced by the liquid in the sample is determined and used to adjust the coincidence resolving time according to an empirical relationship; during the second period the sample is measured according to normal procedures with the coincidence resolving time now fixed.

Figure 7:
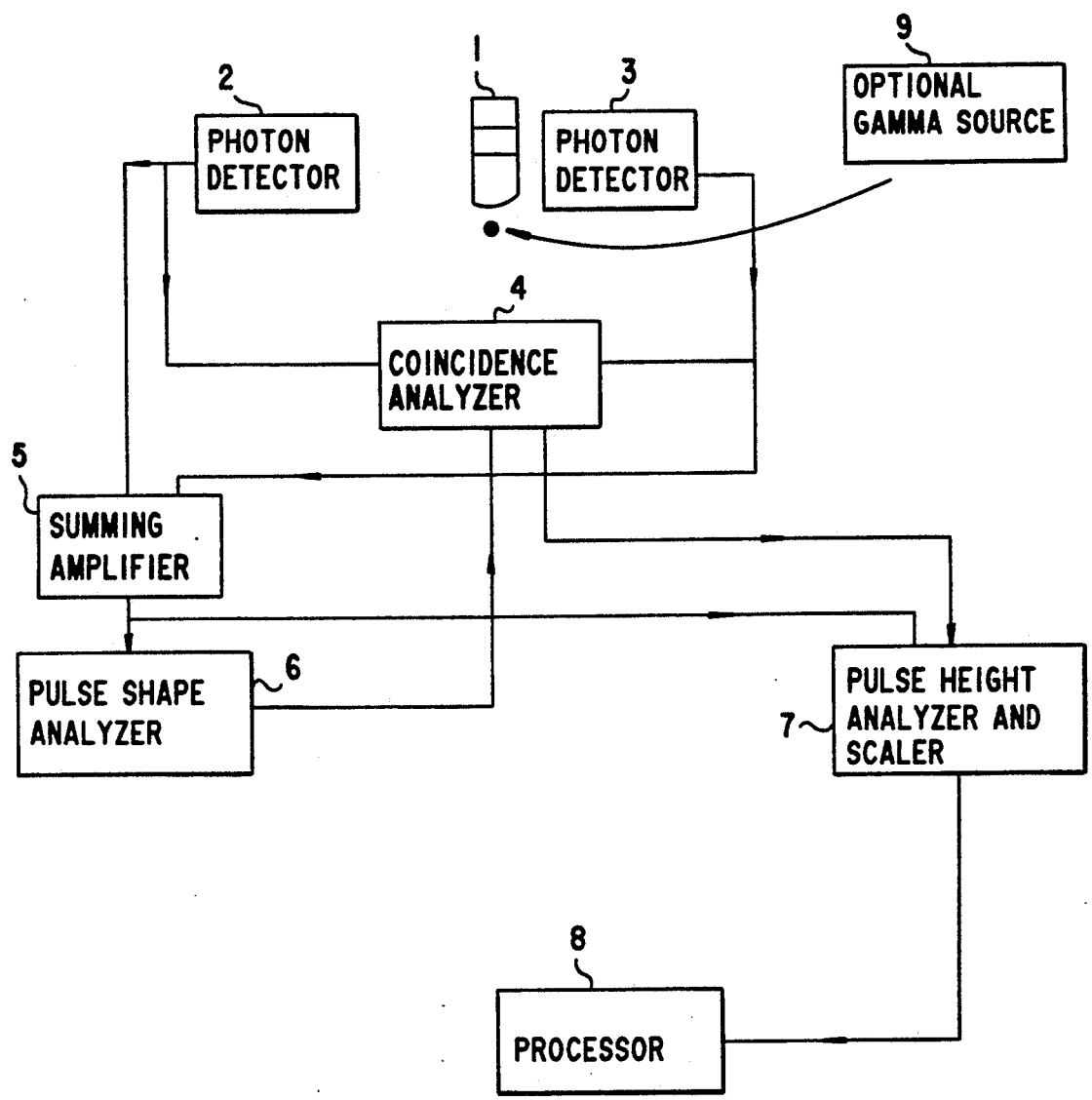
FIG. 7 shows a block diagram of a general embodiment of a scintillation counter according to this invention.

A general embodiment of this invention is shown in the block diagram in FIG. 7. In this figure, I is a sample to be measured placed in a measuring compartment, and 2 and 3 are photon detectors comprising preamplifiers for detecting the photons emitted by the sample 1. The detectors are connected to a coincidence analyzer 4, having an adjustable coincidence resolving time. The outputs of the two detectors are also connected to a summing amplifier 5, which is connected to a pulse shape analyzing means 6, which measures the pulse length of the scintillation pulses and adjusts the coincidence resolving time of coincidence analyzer 4. The analyzer 4 and the summing amplifier 5 are connected to a pulse height analyzer and scaler means 7, which analyzes and counts the pulses that are approved by the coincidence analyzer 4. The device 7 also computes a quench index. The computed quench index and the measured count rate is transferred to processing means 8, for further data reduction and for output to an external device (not indicated in the diagram).

Generally, in all embodiments of this invention, the pulse length can be determined either by using the pulses produced by the internal radioisotope dissolved in the sample or by an external gamma-radiating source momentarily placed adjacent to the sample in the measuring compartment during the first measuring period.

EXAMPLES OF EMBODIMENTS

In a first embodiment of this invention, the pulse length is determined by registering the pulse shape for a number of pulses by using an analog-to-digital converter to convert each pulse into a digital form that can be stored as a histogram in a multichannel analyzer, where each channel corresponds to a small fraction of time. The weighted mean or first moment of the histogram, the slope of the histogram at some part of it, or the channel dividing the histogram into two areas having a certain ratio are examples of possible measures of the pulse length.

Figure 1:
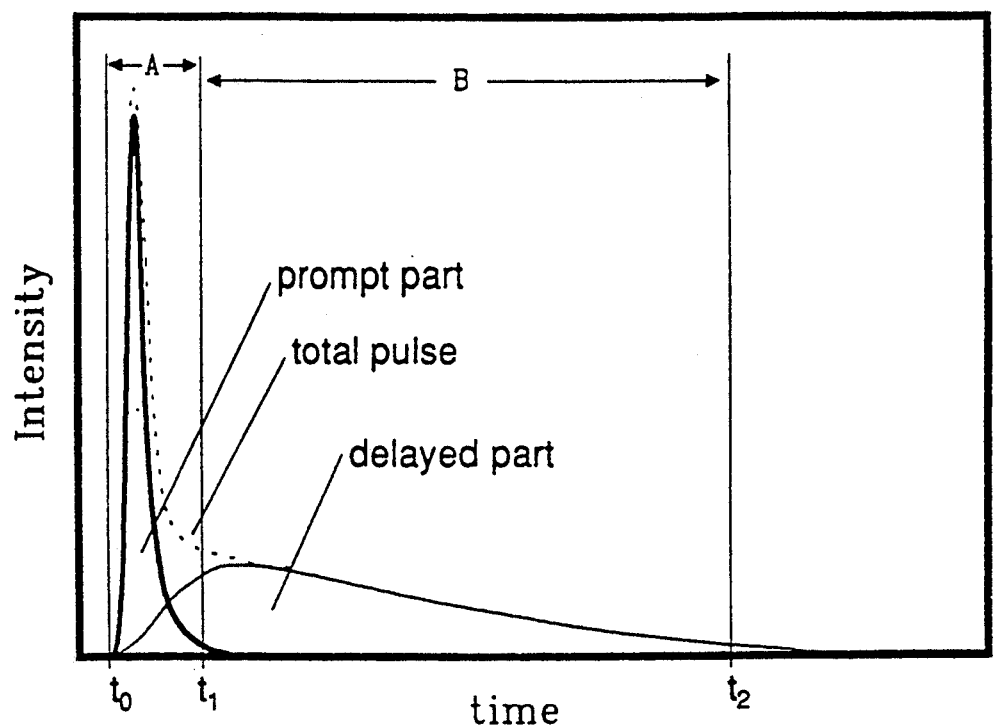
FIG. 1 shows a typical scintillation decay curve and two time intervals set so that a simple measure for the pulse length can be obtained.
Figure 2:
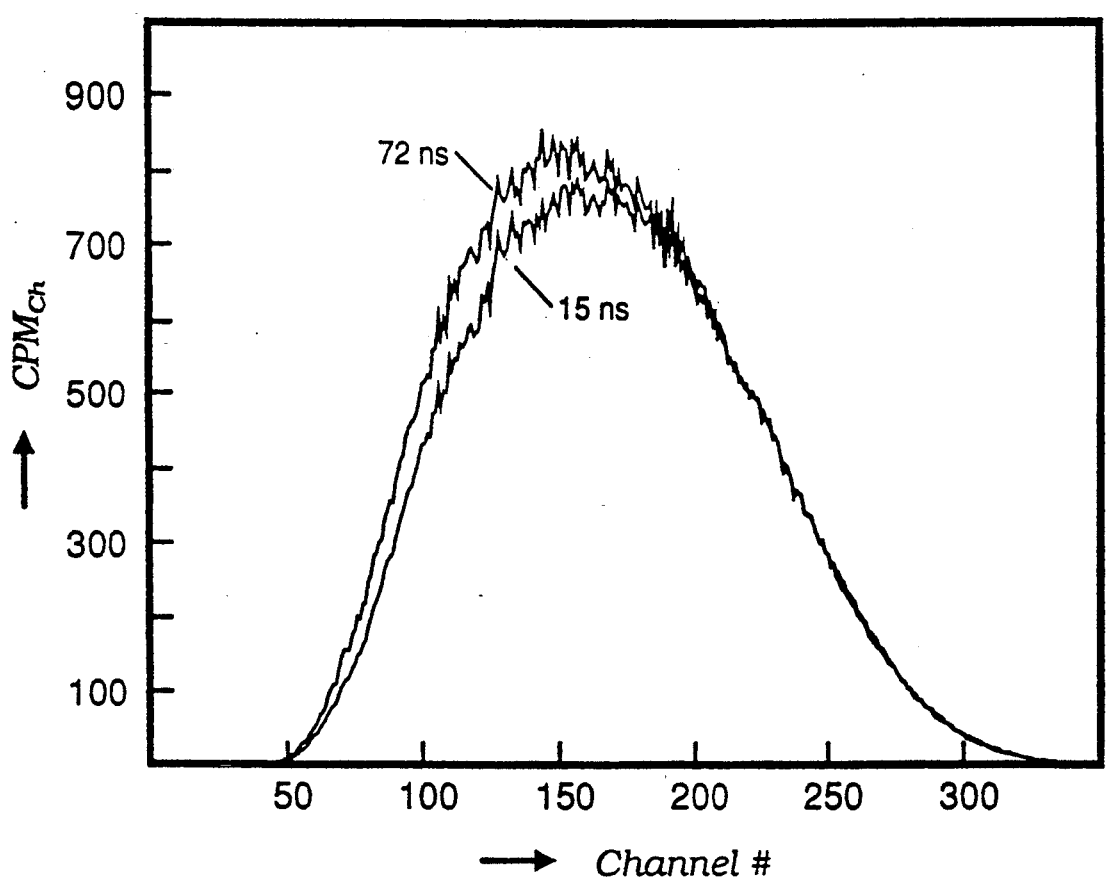
FIG. 2 shows the influence of the coincidence resolving time on the shape of a tritium spectrum.
Figure 3:
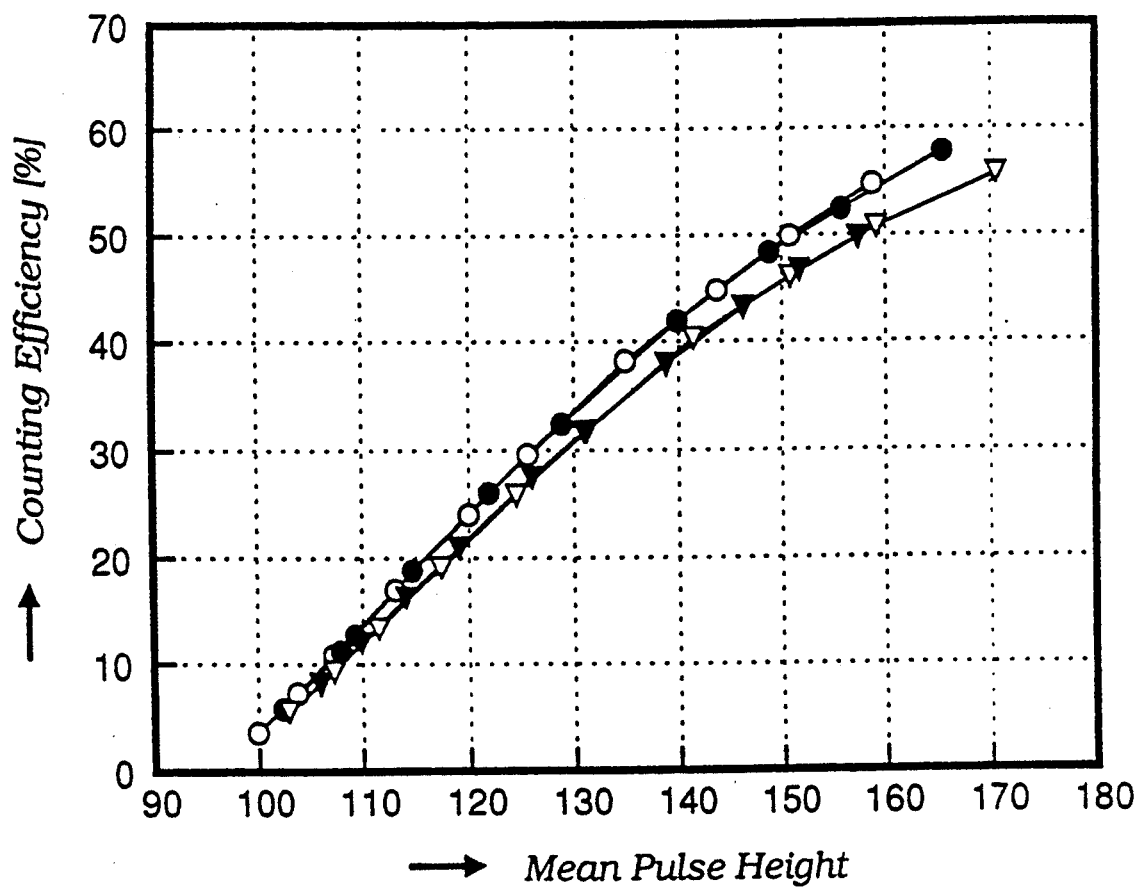
FIG. 3 shows four quench curves prepared with standards based on toluene, xylene, pseudocumene and diisopropyl-naphthalene.
Figure 4:
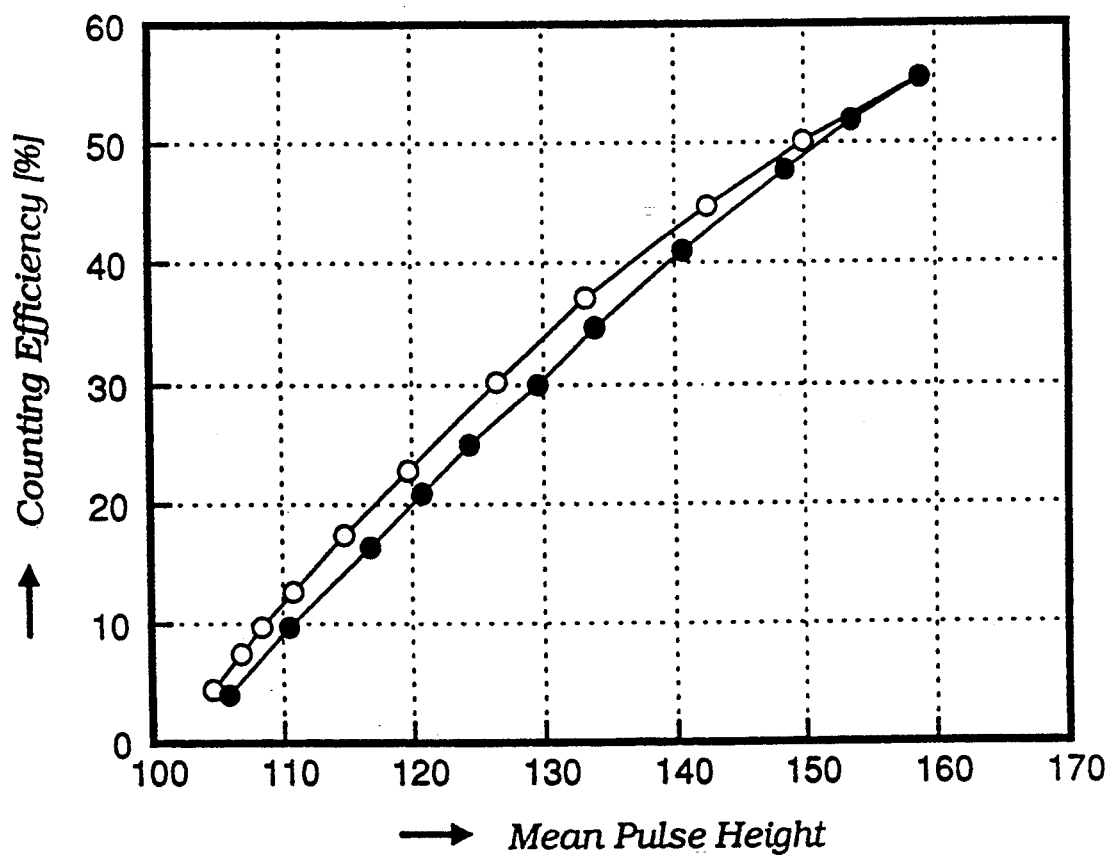
FIG. 4 shows the quench curves for standards based on toluene, but with two different quenchers: carbon tetrachloride and acetone.
Figure 5:
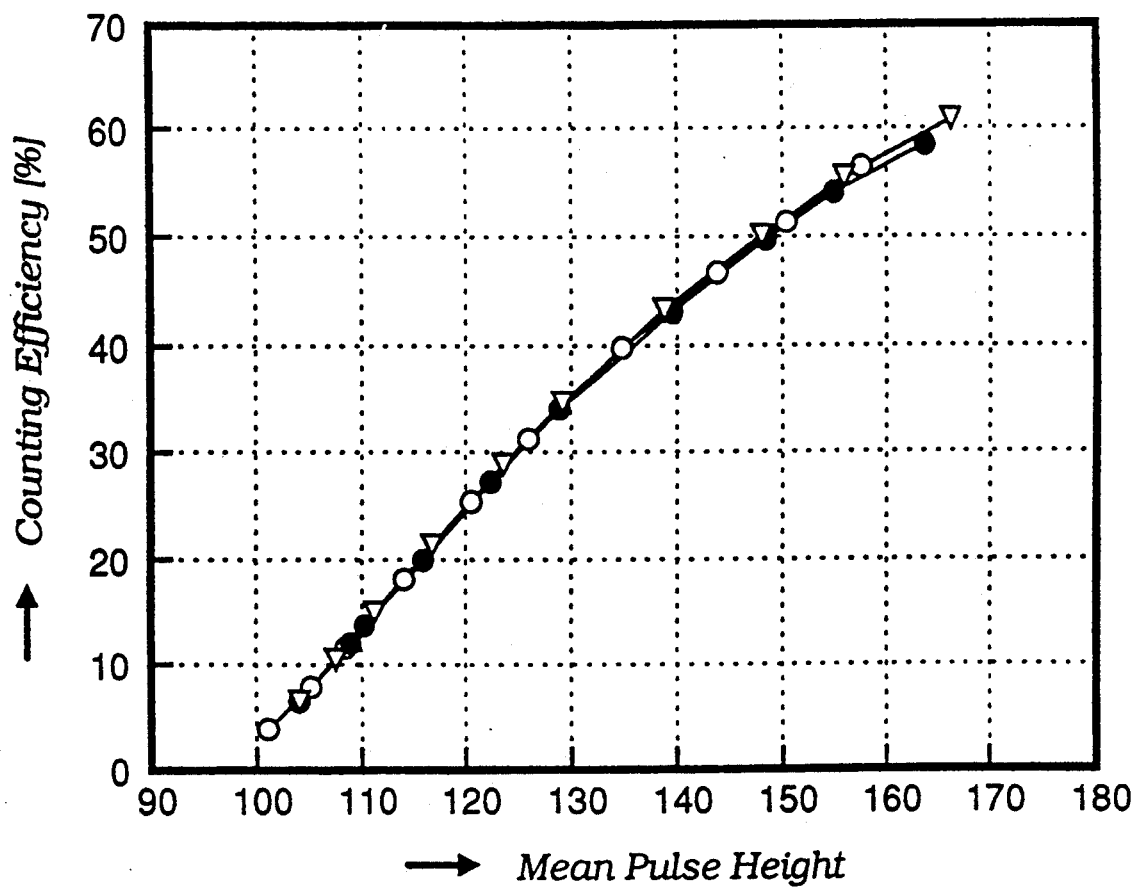
FIG. 5 shows quench curves for the same samples as used in FIG. 3, but with the coincidence resolving time increased to above 250 ns.
Figure 6:
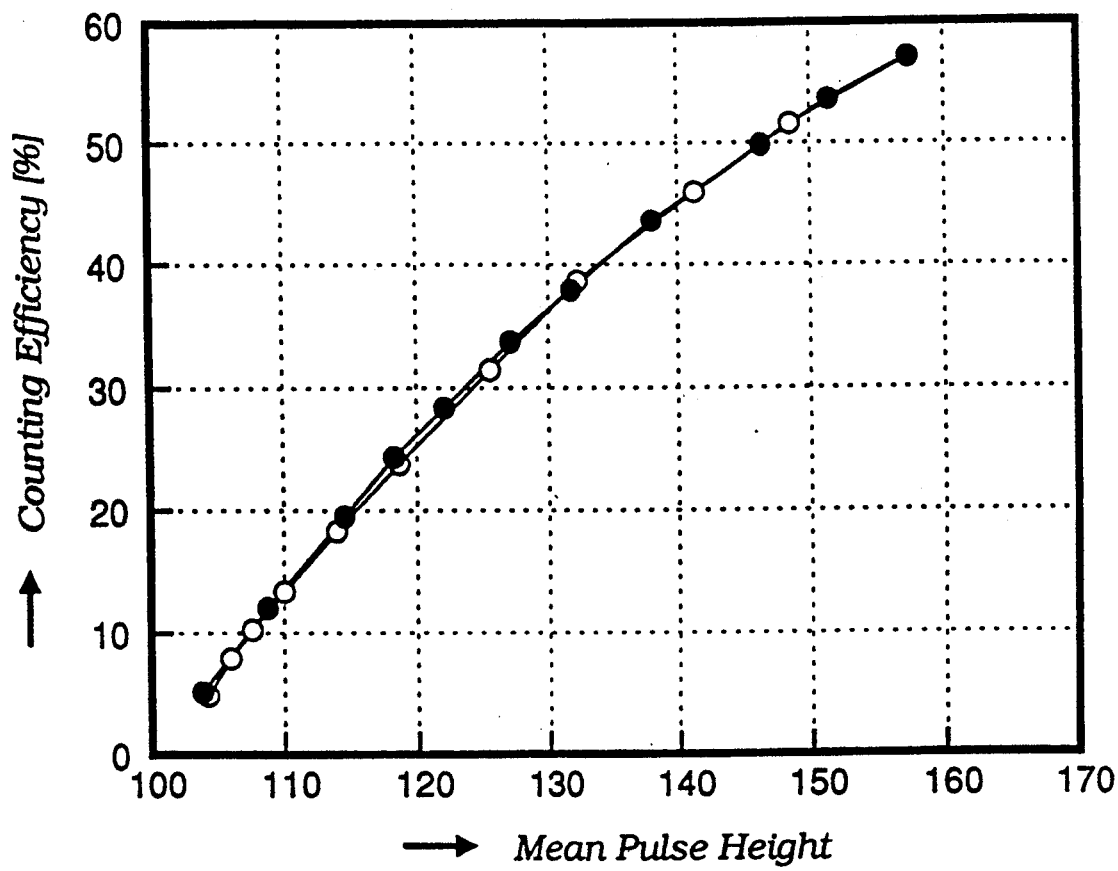
FIG. 6 shows quench curves for the same samples as used in FIG. 4, but with the coincidence resolving time increased to 72 ns.

In fact, it is not necessary to register the complete pulse histogram in order to obtain an exact value for the pulse length, but any measure that is proportional to this value is sufficient. In a second embodiment, the pulse is integrated in two time intervals, denoted by A and B in FIG. 1. The intensities of part A (the area under the curve between times $t_0$ and $t_1$) and part B (the area under the curve between times $t_1$ and $t_2$) are measured for a number of pulses, and a mean value for the ratio between these two intensities calculated and used as a measure for the pulse length.

In a third embodiment, during the first measuring period, the ratio between the two intensities A and B are computed for each pulse separately and compared to a predetermined limit. The pulse is directed to either one of two scalers depending on the result of this comparison. The number of pulses collected in the two scalers are then used to compute a ratio which is proportional to the desired pulse length.

Further embodiments may employ different schemes wherein the most suitable coincidence resolving time is found by measuring, during the first measuring period, the effect of the coincidence resolving time on the pulse rate. Thereafter, the final coincidence resolving time could be set so that at least 95% of the maximum count rate found during the first measuring period is achieved during the second measuring period.

We claim:

1. Method of scintillation counting comprising the steps of:

measuring sequentially and automatically a plurality of scintillation samples capable of emitting photons clustered together in scintillation pulses as a result of radioactive decays occurring either inside or outside of each sample, detecting said scintillation pulses emitted from each of said scintillation samples by one or more photodetectors, connecting a coincidence analyzer to said one or more photodetectors, said analyzer having an adjustable coincidence resolving time, connecting one or more incremental scalers to said coincidence analyzer and said one or more photodetectors, incrementing the number in said one or more scalers when at least one pulse from each of said one or more photodetectors is present within said coincidence resolving time, determining for each sample separately the pulse length of the scintillation pulses during in first measuring period, and automatically adjusting said coincidence resolving time for each sample separately in proportion to the determined pulse length prior to a second measurement of said sample in a second measuring period.

2. Method according to claim 1, characterized by determining the pulse length by registering the pulse shape for a number of pulses by using an analog-to-digital converter to convert each pulse into a digital form for storage a histogram in a multichannel analyzer, where each channel corresponds to a fraction of time, where the pulse length is the weighted mean or first moment of the histogram, the slope of the histogram at some part of its, or the channel dividing the histogram into two areas having a certain ratio.

3. Method according to claim 1, characterized by determining the pulse length for each sample separately by measuring for each scintillation pulse, a first intensity value in a first time interval and a second intensity value in a second time interval, adding together the number of pulses recorded during said first measuring period, said first intensity value to yield first total intensity and said second intensity value to yield a second total intensity, computing the pulse length from the values of said first total intensity and said second total intensity.

4. Method according to claim 1, characterized by determining the pulse length for each sample separately by using a first and a second incremental scaler, measuring for each scintillation pulse during said first measuring period, a first intensity value in a first time interval and a second intensity value in a second time interval, computing the ratio between said intensities and comparing said ratio to a certain predetermined limit, incrementing said first scaler if said ratio exceeds said limit and incrementing said second scaler if said ratio does not exceed said limit, and, computing the pulse length from the number of pulses stored in said scalers at the end of said first measuring period, where said first time interval extends from time $t_0$ to time $t_1$ and said second time interval extends from the time $t_1$ to time $t_2$ and that $t_0 < t_1 < t_2$.

5. Method according to claim 1, characterized by determining the pulse length for each sample separately by determining a first rate of coincidence events when said adjustable coincidence resolving time is equal to $crt_1$, determining a second rate of coincidence events when said adjustable coincidence resolving time is equal to $crt_2$, computing the pulse length from the ratio between said first rate and said second rate.

6. Method according to claim 1, characterized by determining the pulse length for each sample separately, automatically adjusting said coincidence resolving time for each sample separately in proportion to the determined pulse length comprises, determining the rate of true coincidence events produced by radioactive decays at at least two coincidence resolving times, determining the maximum rate of true coincidence events produced by radioactive decays, automatically adjusting said coincidence resolving time so that a fixed fraction of said true maximum rate is recorded.

7. Method according to claim 6, characterized by determining for each sample separately the rate of true coincidence events produced by radioactive decays by measuring the rate of all coincidence events, measuring the rate of random coincidence events, equating the true rate of detectable coincidence events produced by radioactive decays with the difference between said rate of all coincidence events and said rate of random coincidence events.

8. Method according to any one of claims 1–7, characterized by determining for each sample separately the pulse length by positioning a gamma-ray emitting source adjacent to said sample for causing Compton electrons, and determining the length of the scintillation pulses produced by said compton electrons.

9. Scintillation counter comprising:

means for measuring sequentially and automatically a plurality of scintillation samples capable of emitting photons clustered together in scintillation pulses as a result of radioactive decays occurring either inside or outside of each sample, one or more photodetectors detecting said scintillation pulses emitted from each of said scintillation samples, a coincidence analyzer connected to said one or more photodetectors, said analyzer having an adjustable coincidence resolving time, one or more incremental scalers connected to said coincidence analyzer and said one or more photodetectors, means for incrementing the number in said one or more scalers when at least one pulse from each of said one or more photodetectors is present within said coincidence resolving time, means for determining for each sample separately the pulse length of the scintillation pulses during a first measuring period, and means for automatically adjusting said coincidence resolving time for each sample separately in proportion to said determined pulse length prior to a second measurement of said sample in a second measuring period.

10. Scintillation counter according to claim 9, characterized by that the pulse length is determined by registering the pulse shape for a number of pulses by using an analog-to-digital converter to convert each pulse into a digital form for storage as a histogram in a multichannel analyzer, where each channel corresponds to a fraction of time, where the pulse length is the weighted mean or first moment of the histogram, the slope of the histogram at some part of it, or the channel dividing the histogram into two areas having a certain ratio.

11. Scintillation counter according to claim 9, characterized by that said means for determining for each sample separately the pulse length comprises, means for measuring for each scintillation pulse, a first intensity value in a first time interval and a second intensity value in a second time interval, means for adding together for a number of pulses recorded during said first measuring period, said first intensity value to yield a first total intensity and said second intensity value to yield a second total intensity, means for computing the pulse length from the values of said first total intensity and said second total intensity.

12. Scintillation counter according to claim 9, characterized by that said means for determining for each sample separately the pulse length comprises, a first and a second incremental scaler, means for measuring for each scintillation pulse during said first measuring period, a first intensity value in a first time interval and a second intensity value in a second time interval, means for computing the ratio between said intensities and comparing said ratio to a certain predetermined limit, means for incrementing said first scaler if said ratio exceeds said limit and incrementing said second scaler if said ratio does not exceed said limit, and, means for computing the pulse length from the number of pulses stored in said scalers at the end of said first measuring period, where said first time interval extends from time $t_0$ to time $t_1$ and said second time interval extends from the time $t_1$ to time $t_2$ and that $t_0 < t_1 < t_2$.

13. Scintillation counter according to claim 9, characterized by that said means for determining for each sample separately the pulse length comprises, means for determining a first rate of coincidence events when said adjustable coincidence resolving time is equal to $crt_1$, means for determining a second rate of coincidence events when said adjustable coincidence resolving time is equal to $crt_2$, means for computing the pulse length from the ratio between said first rate and said second rate.

14. Scintillation counter according to claim 9, characterized by that said means for determining for each sample separately the pulse length and said means for automatically adjusting said coincidence resolving time for each sample separately in proportion to said determined pulse length comprises, means for determining the rate of true coincidence events produced by radioactive decays at at least two coincidence resolving times, means for determining the maximum rate of true coincidence events produced by radioactive decays, means for automatically adjusting said coincidence resolving time so that a fixed fraction of said true maximum rate is recorded.

15. Scintillation counter according to claim 9, characterized by that said means for determining for each sample separately the rate of true coincidence events produced by radioactive decays comprises means for measuring the rate of all coincidence events, means for measuring the rate of random coincidence events, means for equating the true rate of detectable coincidence events produced by radioactive decays with the difference between said rate of all coincidence events and said rate of random coincidence events.

16. Scintillation counter according to any one of claims 9–15, characterized by that said means for determining for each sample separately the pulse length comprises a gamma-ray emitting source adjacent to said sample for causing Compton electrons, and means for determining the length of the scintillation pulses produced by said Compton electrons.

* * * * *